US012115831B2

(12) United States Patent
Abdeddine (10) Patent No.: US 12,115,831 B2
(45) Date of Patent: Oct. 15, 2024

(54) REAR LOWER CONTROL ARM FOR MOTOR VEHICLE

(71) Applicant: ArcelorMittal, Luxembourg (LU)

(72) Inventor: Zakariae Abdeddine, Montataire (FR)

(73) Assignee: ArcelorMittal, Luxembourg (LU)

( * ) Notice: Subject to any disclaimer, the term of this patent is extended or adjusted under 35 U.S.C. 154(b) by 0 days.

(21) Appl. No.: 18/017,490

(22) PCT Filed: Jul. 30, 2020

(86) PCT No.: PCT/IB2020/057190
§ 371 (c)(1),
(2) Date: Jan. 23, 2023

(87) PCT Pub. No.: WO2022/023794
PCT Pub. Date: Feb. 3, 2022

(65) Prior Publication Data
US 2023/0271466 A1 Aug. 31, 2023

(51) Int. Cl.
*B60G 7/00* (2006.01)
(52) U.S. Cl.
CPC .......... *B60G 7/001* (2013.01); *B60G 2200/14* (2013.01); *B60G 2204/41* (2013.01); *B60G 2206/121* (2013.01); *B60G 2206/72* (2013.01); *B60G 2206/8201* (2013.01)
(58) Field of Classification Search
CPC ............ B60G 2200/14; B60G 2204/41; B60G 2206/121; B60G 2206/72; B60G 2206/8201; B60G 7/001
USPC .................................................. 280/124.111
See application file for complete search history.

(56) References Cited

U.S. PATENT DOCUMENTS

| 5,845,938 A * | 12/1998 | Kato | B60G 7/001 |
| | | | 280/784 |
| 5,992,867 A | 11/1999 | Kato et al. | |
| 8,167,325 B2 * | 5/2012 | Lee | B60G 7/001 |
| | | | 280/124.135 |
| 11,254,163 B2 * | 2/2022 | Ebert | B60G 9/006 |
| 2003/0205879 A1 | 11/2003 | Davison et al. | |

(Continued)

FOREIGN PATENT DOCUMENTS

| JP | S6248890 U | 3/1987 |
| JP | S63270207 A | 11/1988 |

(Continued)

OTHER PUBLICATIONS

Search Report of PCT/IB2020/057190 of Mar. 25, 2021 and International Report on Patentability.

*Primary Examiner* — Drew J Brown
*Assistant Examiner* — Caitlin Anne Miller
(74) *Attorney, Agent, or Firm* — Davidson Kappel LLC (57) ABSTRACT

Rear lower control arm (5) for a motor vehicle including a top part (5t) and a bottom part (5b) defining together a hollow volume (5h), the top and bottom parts (5t, 5b) each including respectively a top and bottom first hole (17t, 17b) and a top and bottom second hole (19t, 19b), wherein the top and bottom parts (5t, 5b) are joined together by securing together at least part of said top and bottom horizontal surface outer peripheries (5tho, 5bho), at least part of the top and bottom first hole side walls outer peripheries (17tso, 17bso), at least part of said top and bottom second hole side walls outer peripheries (19tso, 19bso).

11 Claims, 8 Drawing Sheets

(56) References Cited

U.S. PATENT DOCUMENTS

| | | | | |
|---|---|---|---|---|
| 2004/0135337 A1* | 7/2004 | Alesso | ............ | B60G 7/001 |
| | | | | 280/124.134 |
| 2011/0285102 A1* | 11/2011 | Yu | ............ | B60G 7/001 |
| | | | | 280/124.134 |
| 2019/0263207 A1 | 8/2019 | Krolo et al. | | |

FOREIGN PATENT DOCUMENTS

| | | | |
|---|---|---|---|
| JP | H09123722 | A | 5/1997 |
| KR | 20100067312 | A | 6/2010 |
| KR | 20170079400 | A | 7/2017 |
| WO | WO02074562 | A2 | 9/2002 |

\* cited by examiner

REAR LOWER CONTROL ARM FOR MOTOR VEHICLE

The present invention relates to a rear lower control arm for a motor vehicle. In particular, it relates to a rear lower control arm for a vehicle having a rear wheel drive propulsion or a four-wheel drive system or an electrical or hybrid powertrain.

SUMMARY OF THE INVENTION

The rear suspension assembly of such types of vehicles are submitted to high forces associated to the torque applied by the rear propulsion and carry an important weight associated to one or several of the following elements according to the type of vehicle: the electrical motor, the battery, the internal combustion engine, the four-wheel drive management device, etc.

This combination of high torque and load exerted on the rear suspension results in challenging conditions for the structural elements linking the rear wheels to the rest of the vehicle, prevalent among them being the rear lower control arms which are arguably the most important structural parts linking the rear wheels to the body of the vehicle.

Alongside the above-mentioned structural requirements of the rear lower control arm, there is also a push to bring down the weight of the rear lower control arm. Indeed, automotive manufacturers are constantly looking for weight saving solutions in general to address environmental concerns associated with the gas consumption of internal combustion engine vehicles and to provide ever longer driving autonomy in the case of electrical or hybrid vehicles. In the specific case of the rear lower control arm, the mass of the part is particularly critical because it is included in what is known as the unsprung mass of the vehicle. This unsprung mass corresponds to all the elements which are not supported by the suspension springs of the vehicle. It includes the wheels and the lower control arms. Reducing the unsprung mass of the vehicle is a key factor to improve vehicle handling and overall passenger comfort.

Hollow rear lower control arms design, also known as clamshell designs, have appeared on the market to address the weight lightning challenge and to enable to produce rear lower control arms using sheet metal stamping rather than casting, the latter being generally more expensive and less productive. Such designs, such as disclosed for example by KR20170079400, include a top and bottom part which are joined together around their edges and a hole to house the spring mount. While this concept is indeed successful in bringing down the weight of the part, it is generally not satisfactory in vibratory performance because of the large generally flat surfaces of the top and bottom parts which resonate and exhibit poor performance in panel mode. It is also not satisfactory in stiffness because of the large generally flat surfaces which will tend to deform under bending or torsional loads.

An object of the present invention is to remedy the shortcomings of the current clamshell designs by providing a rear lower control arm having a clamshell design which remains industrially manufacturable and which has improved vibratory and stiffness performance and also provides additional weight lightning.

The present invention provides:
A rear lower control arm for a motor vehicle comprising a top part and a bottom part defining together a hollow volume, said top and bottom parts each comprising respectively a top and bottom horizontal surface, delimited respectively by a top and bottom horizontal surface outer periphery, top and bottom side walls extending in a general direction of at least 45° compared to the horizontal plane along at least part of the top and bottom horizontal surface outer periphery, said top and bottom side walls being delimited by a top and bottom side wall outer periphery, a top and bottom first hole, comprising respectively top and bottom first hole side walls extending in a general direction of at least 45° compared to the horizontal plane, said top and bottom first hole side walls being delimited by top and bottom first hole side walls outer peripheries, a top and bottom second hole, comprising respectively top and bottom second hole side walls, extending in a general direction of at least 45° compared to the horizontal plane, said top and bottom second hole side walls being delimited by top and bottom second hole side walls outer peripheries, wherein said top and bottom parts are joined together
   by securing together at least part of said top and bottom horizontal surface outer peripheries,
   by securing together at least part of said top and bottom first hole side walls outer peripheries,
   and by securing together at least part of said top and bottom second hole side walls outer peripheries.

The inventors have found that introducing an additional hole compared to the state-of-the-art design surprisingly allows for increased vibration and stiffness performance. The inventors have also found that it is possible to manufacture such a part using an industrially viable process.

According to other optional features of the rear lower control arm according to the invention, considered alone or according to any possible technical combination:
   the top and bottom parts are joined together by welding
   the top and bottom first hole side walls outer peripheries are joined together by the intermediary of a first intermediate part, wherein the top first hole side walls outer periphery is attached to the first intermediate part along a top first hole assembly perimeter, the bottom first hole side walls outer periphery is attached to the first intermediate part along a bottom first hole assembly perimeter and wherein said top first hole assembly perimeter is located higher than said bottom first hole assembly perimeter in the elevation direction
   the top and bottom second hole side walls outer peripheries are joined together by the intermediary of a second intermediate part, wherein the top second hole side walls outer periphery is attached to the second intermediate part along a top second hole assembly perimeter, the bottom second hole side walls outer periphery is attached to the second intermediate part along a bottom second hole assembly perimeter and wherein said top second hole assembly perimeter is located higher in the elevation direction than said bottom second hole assembly perimeter
   the rear lower control arm comprises four attachment points for chassis elements of the vehicle, said four attachment points being equipped with bushings comprising a vibration damping material
   the top and bottom side walls do not extend around the entire length of respectively the top and bottom horizontal surface outer periphery, the areas in which the top and bottom side walls do not extend being called respectively top and bottom side wall apertures and wherein the bushings are located in between at least part of said top and bottom side wall apertures, and/or the top and bottom parts are made of steel having an ultimate tensile strength above 780 MPa, as measured according to ISO standard ISO 6892-1, published in October 2009.

The present invention further concerns a method for producing a rear lower control arm as described above, comprising the steps of:

a/providing a first a second flat sheet b/forming said first and second flat sheet, in order to produce a top part and a bottom part comprising respectively a top and bottom horizontal surface, top and bottom side walls a top and bottom horizontal surface outer periphery, a top and bottom side wall outer periphery, further comprising respectively a top and bottom first hole, said first holes comprising respectively top and bottom first hole side walls, and top and bottom first hole side walls outer peripheries, and further comprising respectively a top and bottom second hole, said second holes comprising respectively top and bottom second hole side walls, and top and bottom second hole side walls outer peripheries c/joining together said top and bottom parts by securing them together along at least part of the top and bottom side wall outer periphery, by securing them together along at least part of the top and bottom first hole side walls outer peripheries, and by securing them together along at least part of the top and bottom second hole side walls outer peripheries.

According to other optional features of the rear lower control arm production method according to the invention, considered alone or according to any possible technical combination, the method further comprises the steps of:

providing a first intermediate part and joining the top and bottom first hole side walls outer peripheries to said first intermediate part to form a top and bottom first hole assembly perimeter providing a second intermediate part and joining the top and bottom second hole side walls outer peripheries to said second intermediate part to form a top and bottom second hole assembly perimeter, and/or providing bushings comprising a vibration damping material and positioning said bushings in between previously arranged top side wall apertures and bottom side wall apertures.

BRIEF DESCRIPTION OF THE DRAWINGS

Other aspects and advantages of the invention will appear upon reading the following description, given by way of example, and made in reference to the appended drawings, wherein.

DETAILED DESCRIPTION

In the following description, the terms "upper", "lower", "front", "rear", "transverse" and "longitudinal" are defined according to the usual directions of a mounted vehicle. More particularly, the terms "upper" and "lower", are defined according to the elevation direction of the vehicle, the terms "front", "rear" and "longitudinal" are defined according to the front/rear direction of the vehicle and the term "transverse" is defined according to the width of the vehicle. The term "height" refers to the distance between two points, lines, surfaces or volumes as measured in the horizontal direction.

The yield strength, the ultimate tensile strength and the uniform and total elongation are measured according to ISO standard ISO 6892-1, published in October 2009.

By average thickness of a part, or of a portion of a part, it is meant the overall average thickness of the material making up the part after it has been formed into a 3-dimensional part from an initially flat sheet.

Figure 1:
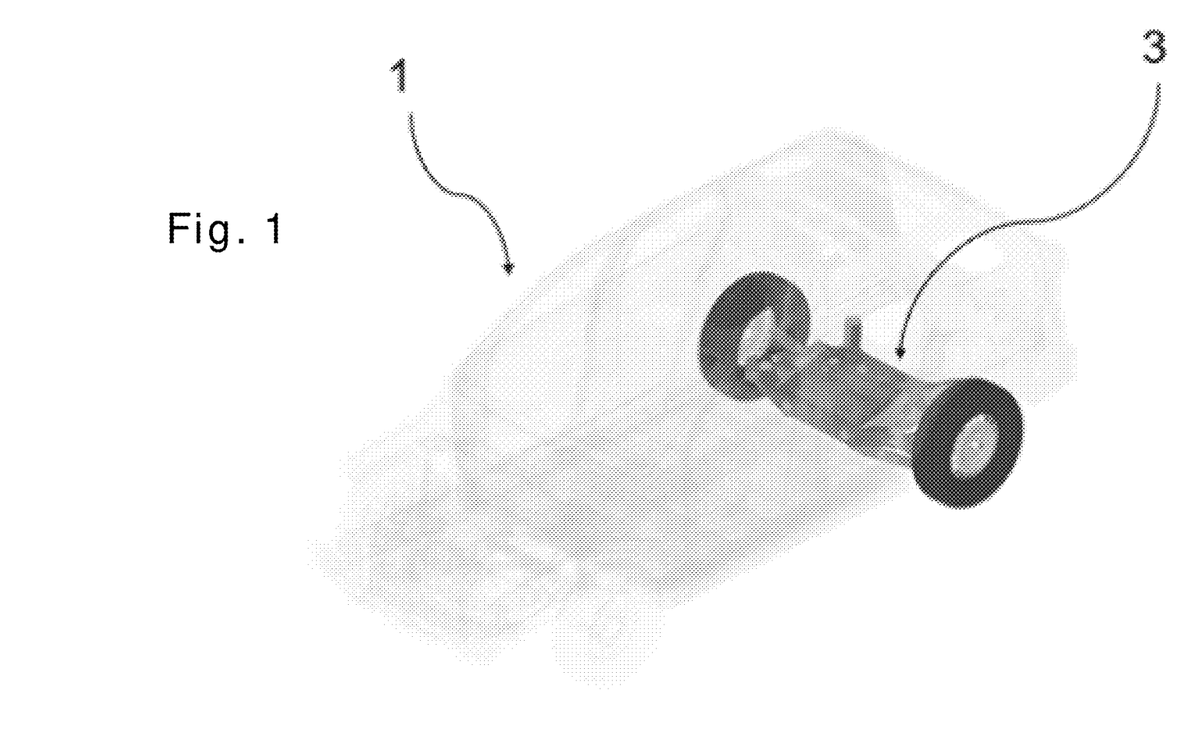
FIG. 1 is an overall perspective view of a vehicle according to the invention.
Figure 2:
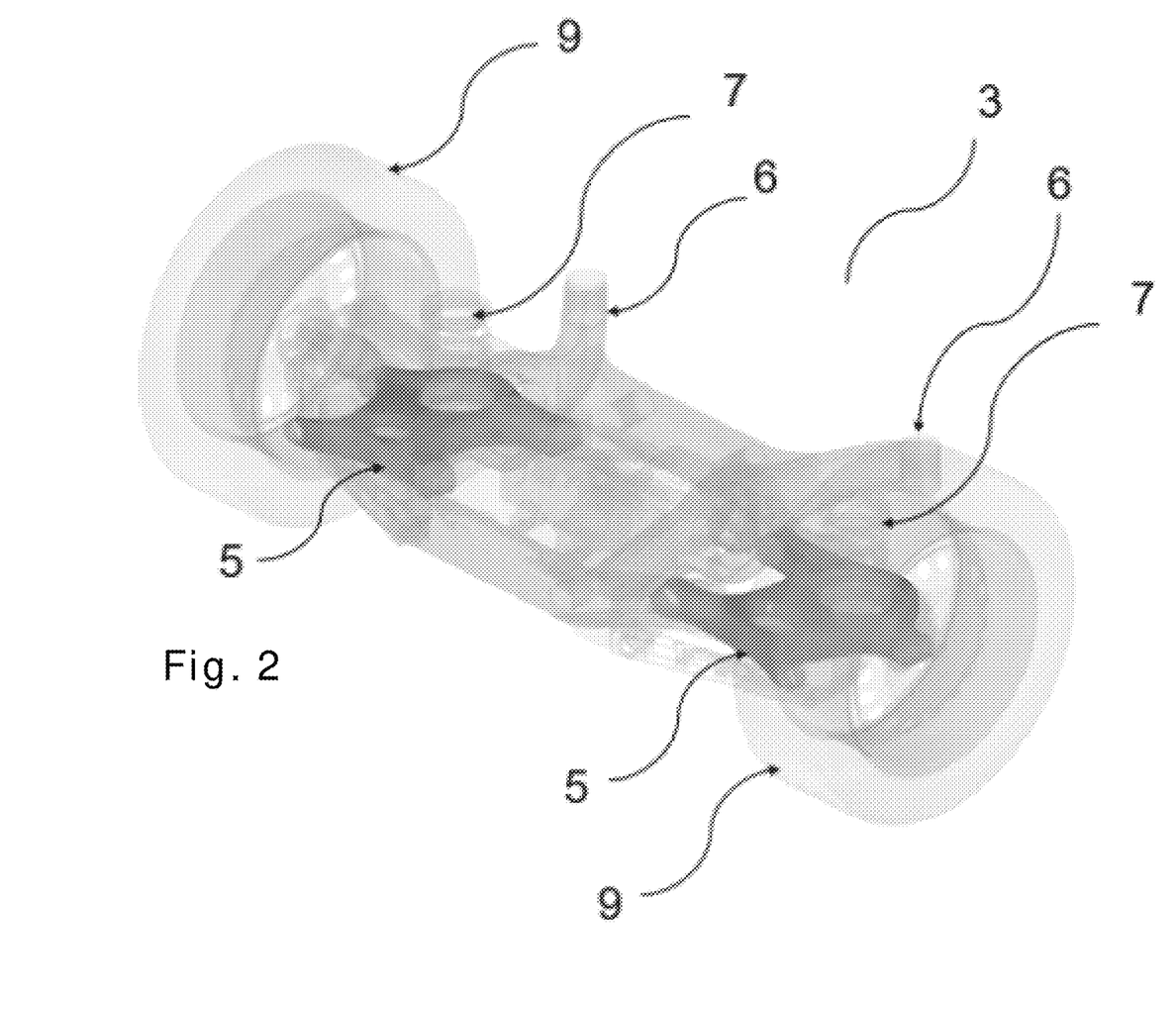
FIG. 2 is an overall perspective view of a rear suspension train according to the invention.
Figure 3:
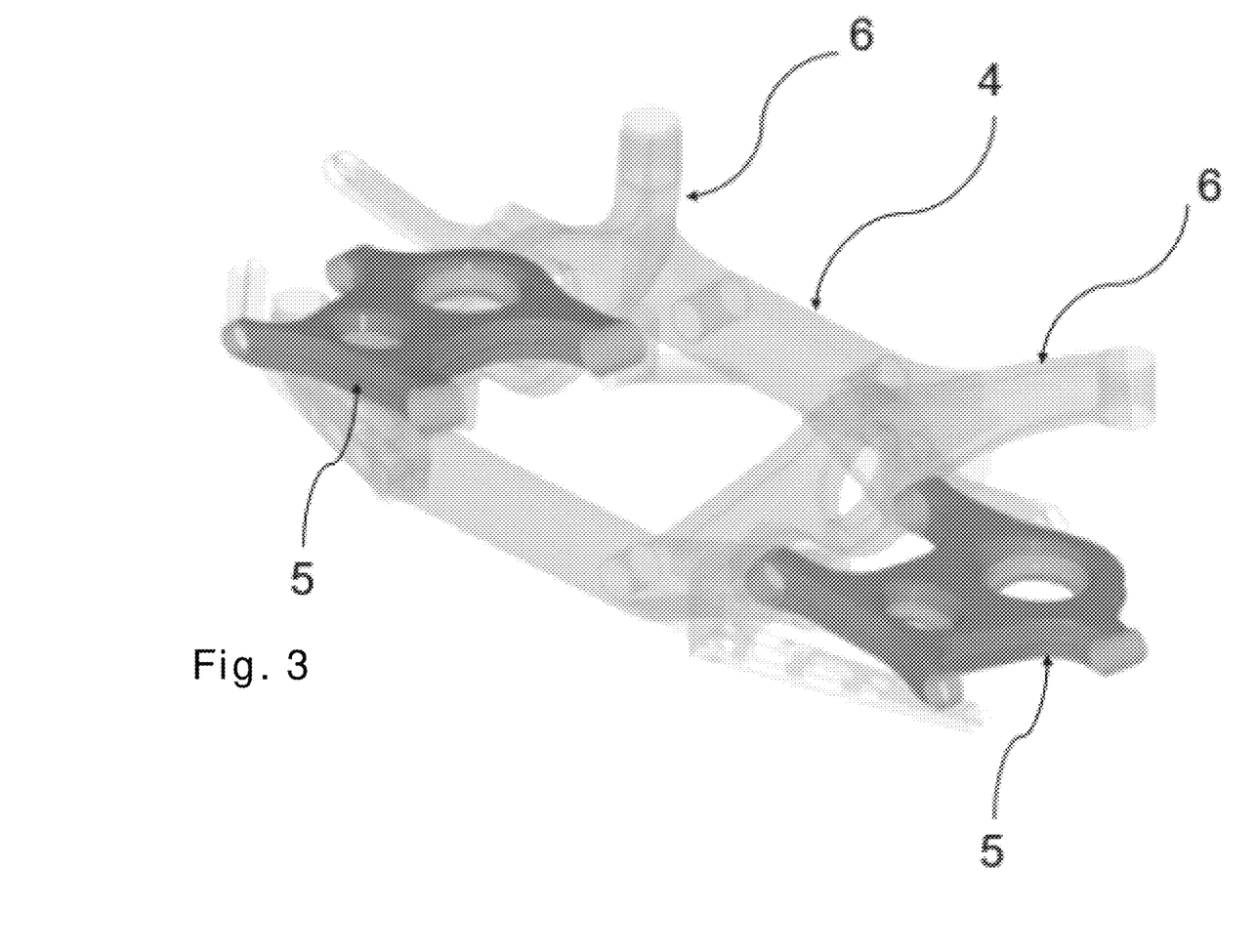
FIG. 3 is a perspective view of a rear cradle and rear lower control arms assembly according to the invention.

Referring to FIGS. 1, 2 and 3, the rear suspension 3 of a motor vehicle 1 comprises for example a rear cradle 4, two rear lower control arms 5, two vibration dampers 7, two wheels 9 and elements to link the wheels 9 to said rear lower control arms 5, such as for example knuckles 11 and integral links 13. (See, e.g., FIG. 4)

The rear cradle 4 hosts a rear internal combustion engine or a rear electrical motor or the rear four-wheel drive management system. The rear cradle 4 is attached to the body of the vehicle 1 for example by securing rear suspension horns 6 to rear members.

The rear cradle 4 is further attached to rear lower control arms 5, present on the right and the left side of the vehicle. Said rear lower control arms 5 are the structural link between the body of the vehicle, to which the rear cradle 4 is attached and the wheels 9.

The vibration damper 7 is attached to the rear lower control arm 5. The vibration damper is for example a coil spring, as depicted in FIG. 2. A gas spring cylinder or hydraulic spring cylinder can also be used as vibration damper 7. Thanks to the presence of the vibration damper 7, the wheels can move up and down independently from the body of the vehicle, allowing for a comfortable ride even on a bumpy road. Furthermore, thanks to this suspension system, all four wheels of the vehicle stay on the road during driving, which is an essential element for good vehicle handling and overall safety. The suspension system is tuned in order to afford the best compromise between vehicle comfort and vehicle handling.

The rear lower control arm 5 is equipped with bushings 15 (see, e.g, FIG. 4), which serve to house the attachment points to the elements to which the rear lower control arm 5 is attached to. The bushings 15 are made for example of a steel cylinder shell housing a vibration damping material, for example rubber like material, in order to absorb the vibrations coming from the interaction between the wheels, the tires and the road.

Figure 4:
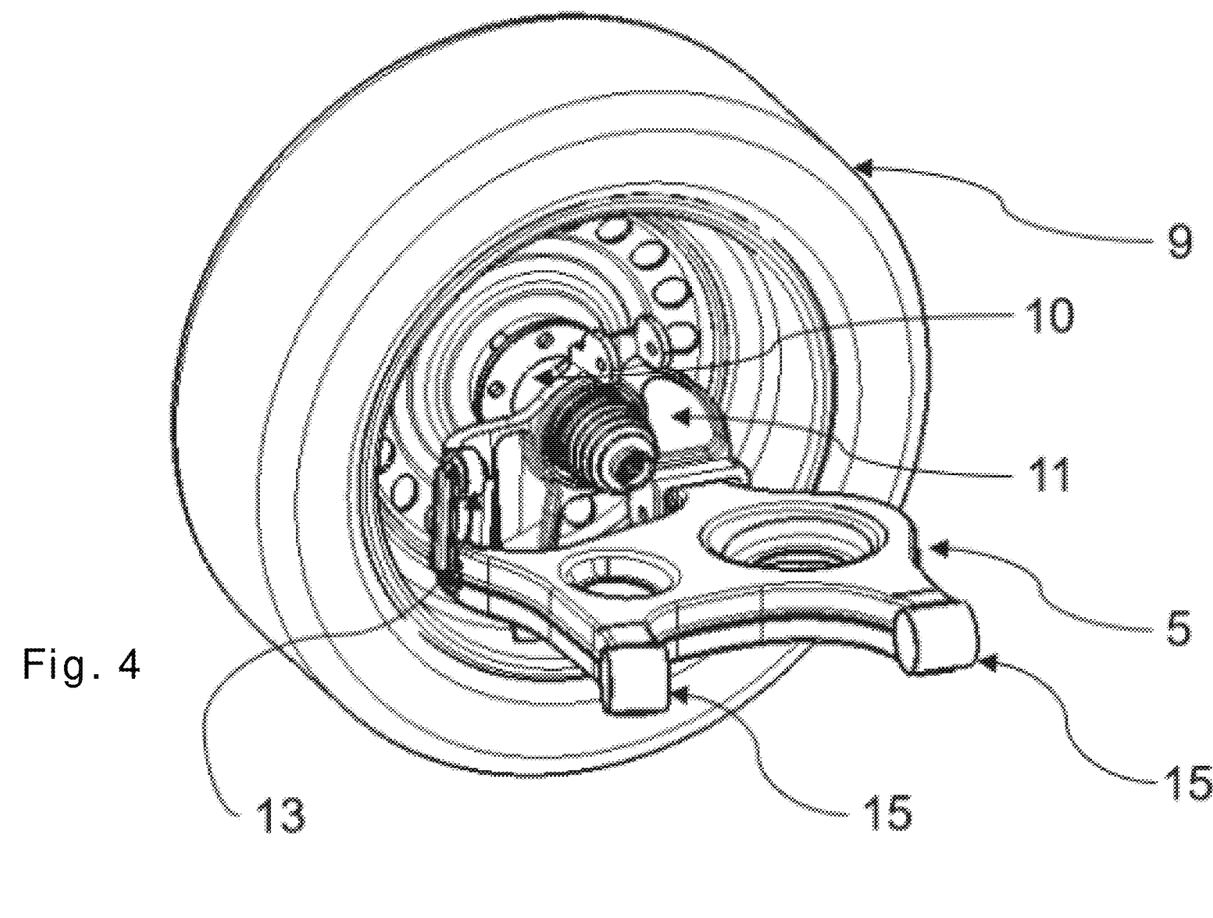
FIG. 4 is a side perspective view of a wheel and rear lower control arm assembly according to the invention.

Referring to FIG. 4, which shows an example of the fixation of the rear lower control arm 5 to the wheel 9, the rear lower control arm 5 is attached to a knuckle 11, itself connected to the wheel hub 10, and to an integral link 13, which is itself connected to the knuckle 11.

Referring to FIG. 3, the other two bushings in the depicted particular embodiment are attached to fixation points on the rear cradle 4.

Figure 5:
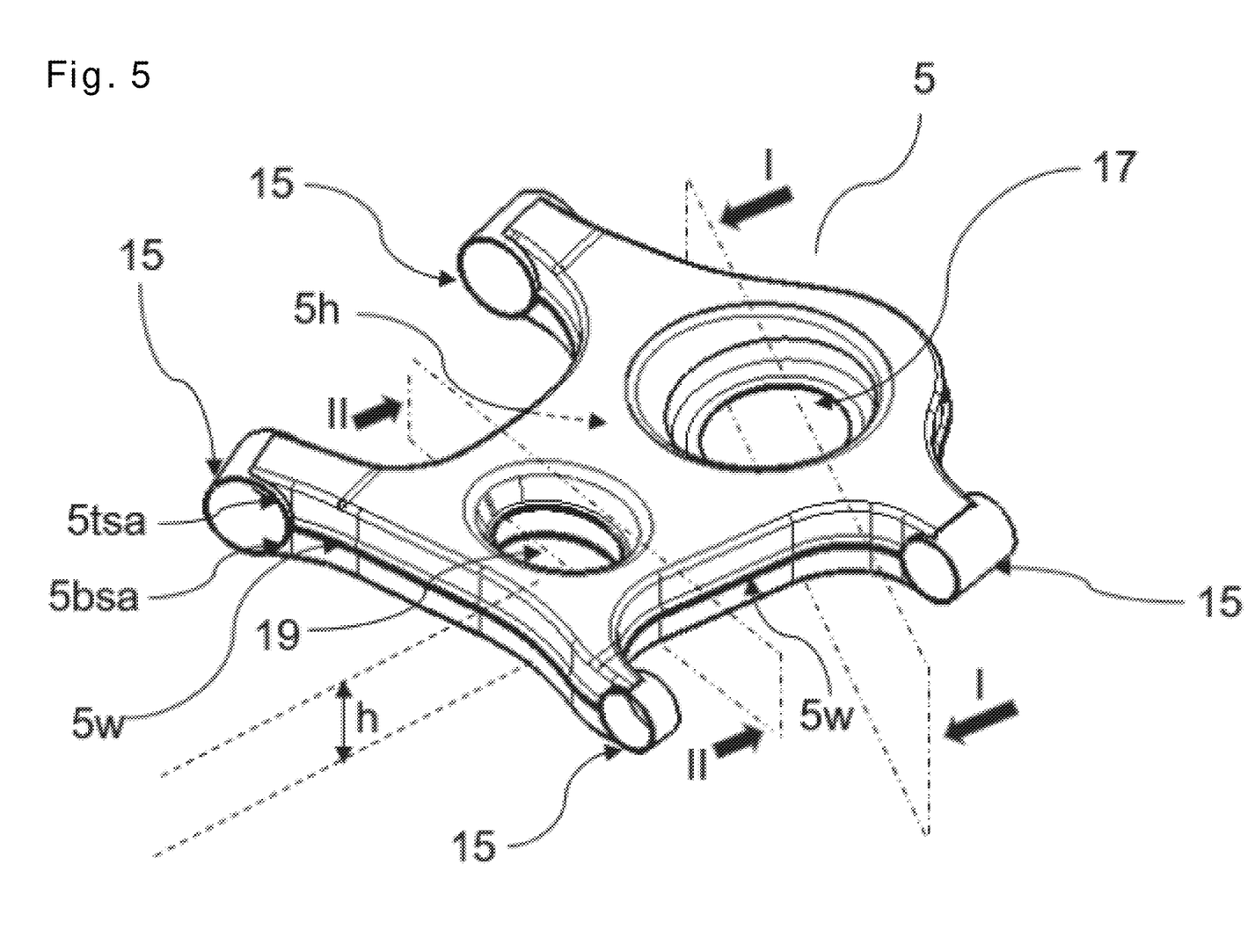
FIG. 5 is a perspective view of a rear lower control arm according to the invention.
Figure 6:
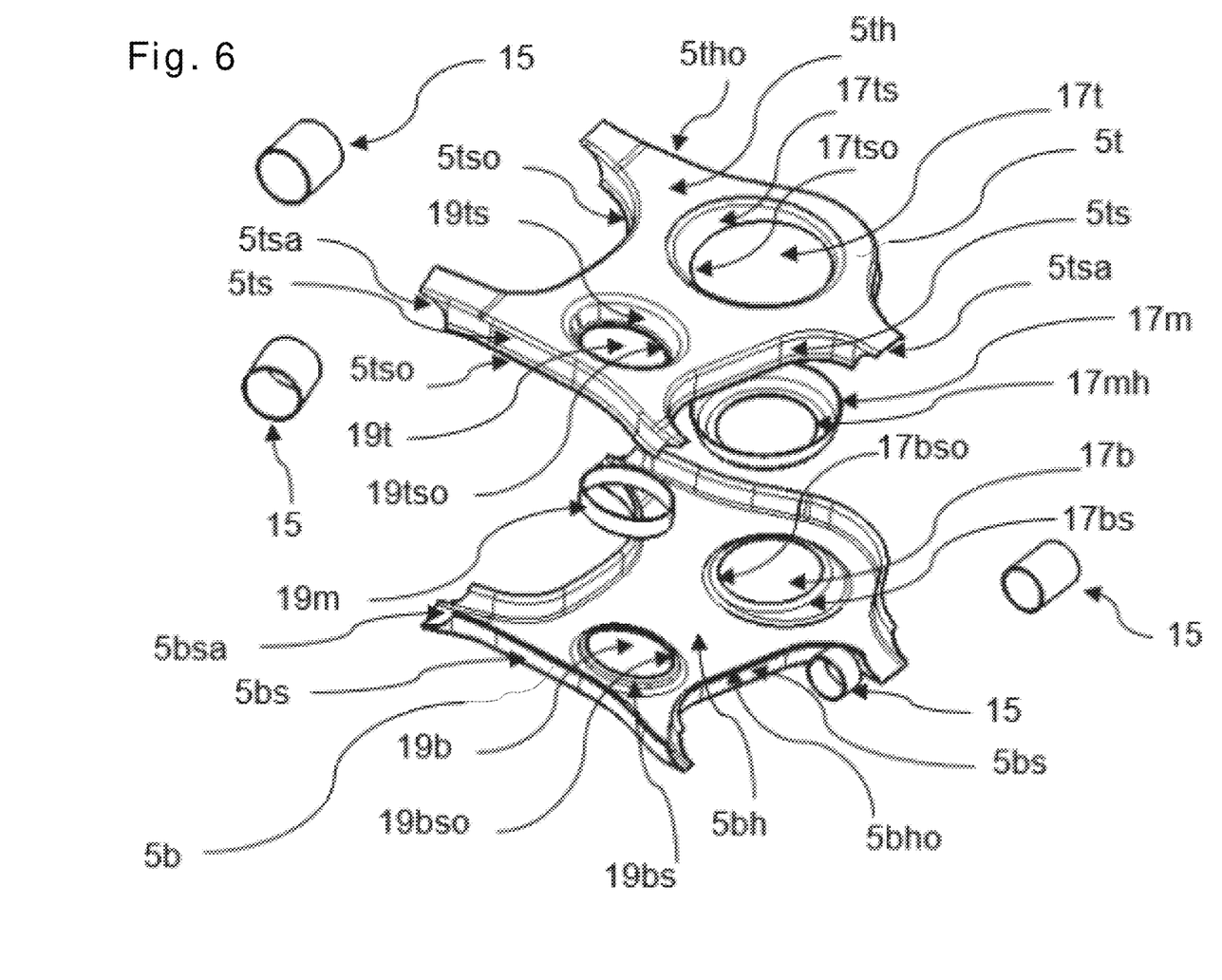
FIG. 6 is an exploded view of a rear lower control arm according to the invention.

Referring to FIGS. 5 and 6, the rear lower control arm 5 consists of a top part 5t and a bottom part 5b defining between them a hollow volume 5h.

The top part 5t comprises a top horizontal surface 5th and top side walls 5ts. The top horizontal surface 5th is delimited by a top horizontal surface outer periphery 5tho. The top side walls 5ts, are delimited by a top side wall outer periphery 5tso. The top horizontal surface 5th extends in a substantially horizontal plane and forms the main surface of the top part 5t. The top side walls 5ts extend along at least a part of the top horizontal surface outer periphery 5tho. The top side walls 5ts extend in a general direction which is at least inclined at 45° compared to the horizontal direction. In a particular embodiment, the top side walls 5ts do not extend around the entire length of the top horizontal surface outer periphery 5tho, as depicted on FIG. 6. The areas of discontinuity of the top side walls 5ts are referred to as top side wall apertures 5tsa. Advantageously, the presence of such apertures 5tsa allows to house bushings 15 in the corners of the rear lower control arm 5. Said bushings 15 serve to connect the rear lower control arm 5 to other elements such as the rear cradle 4 and elements linking the rear lower control arm 5 to the wheel 9. Furthermore, the presence of top side wall apertures 5tsa in the corners of the top part 5t makes it easier to manufacture the top part 5t by stamping a flat sheet. Indeed, if the top side walls 5ts run along the entire top horizontal surface outer periphery 5tho, including the corners of the top part 5t, the top part 5t would have areas in which the deformation would extend in 3 different directions (the vertical direction and two orthogonal horizontal directions). This type of deformation is very difficult to achieve in the case of high strength materials, such as high strength steels. The presence of top side wall apertures 5tsa therefore advantageously increases the stamping feasibility of the top part 5t.

Similar to the top part 5t, the bottom part 5b comprises a bottom horizontal surface 5bh and bottom side walls 5bs. The bottom horizontal surface 5bh is delimited by a bottom horizontal surface outer periphery 5bho. The bottom side walls 5bs, are delimited by a bottom side wall outer periphery 5bso. The bottom horizontal surface 5bh extends in a substantially horizontal plane and forms the main surface of the bottom part 5b. The bottom side walls 5bs extend along at least a part of the bottom horizontal surface outer periphery 5bho. The bottom side walls 5bs extend in a general direction which is at least inclined at 45° compared to the horizontal direction. In a particular embodiment, the bottom side walls 5bs do not extend around the entire length of the bottom horizontal surface outer periphery 5bho, as depicted on FIG. 6. The areas of discontinuity of the bottom side walls 5bs are referred to as bottom side wall apertures 5bsa. Advantageously, the presence of such apertures 5bsa allows to house bushings 15 in the corners of the rear lower control arm 5. Said bushings 15 serve to connect the rear lower control arm 5 to other elements such as the rear cradle 4 and elements linking the rear lower control arm 5 to the wheel 9. Furthermore, the presence of bottom side wall apertures 5bsa in the corners of the bottom part 5b makes it easier to manufacture the bottom part 5b by stamping a flat sheet. Indeed, if the bottom side walls 5bs run along the entire bottom horizontal surface outer periphery 5bho, including the corners of the bottom part 5b, the bottom part 5b would have areas in which the deformation would extend in 3 different directions (the vertical direction and two orthogonal horizontal directions). This type of deformation is very difficult to achieve in the case of high strength materials, such as high strength steels. The presence of bottom side wall apertures 5bsa therefore advantageously increases the stamping feasibility of the bottom part 5b.

In a particular embodiment, the top and bottom side walls 5ts, 5bs do not extend around respectively the entire length of the top and bottom horizontal surface outer periphery 5tho, 5bho, as depicted on FIG. 6. The areas of discontinuity of the top side walls 5ts are referred to as top and bottom side wall apertures 5tsa, 5bsa. Advantageously, the presence of such apertures 5tsa, 5bsa allows to house bushings 15 in the corners of the rear lower control arm 5, as pictured on FIG. 5. Said bushings 15 serve to connect the rear lower control arm 5 to other elements such as the rear cradle 4 and elements linking the rear lower control arm 5 to the wheel 9. Furthermore, the presence of side wall apertures 5tsa, 5bsa in the corners of the top and bottom parts 5t, 5b makes it easier to manufacture the top and bottom parts 5t, 5b by stamping a flat sheet. Indeed, if the side walls 5ts, 5bs run along the entire horizontal surface outer periphery 5tho, 5bho including the corners of the parts 5t, 5b, the parts 5t, 5b would have areas in which the stamping deformation would extend in 3 different directions (the vertical direction and two orthogonal horizontal directions). This type of deformation is very difficult to achieve in the case of high strength materials, such as high strength steels. The presence of side wall apertures 5tsa, 5bsa therefore advantageously increases the stamping feasibility of the top and bottom parts 5t, 5b.

The top and bottom parts 5t, 5b are assembled to form the rear lower control arm 5 by securing them together along an assembly perimeter 5w. The assembly perimeter 5w runs along at least part of the top and bottom side wall outer peripheries 5tso, 5bso. The assembly perimeter 5w is formed for example by welding, more particularly for example by Metal Active Gas welding (MAG welding) or by laser welding. Because the top and bottom parts 5t, 5b include side walls 5ts, 5bs, which are generally inclined compared to the horizontal direction by at least 45°, the top and bottom horizontal surfaces 5ts, 5bs are spaced away at a distance h from each other as measured in the vertical direction. The top and bottom horizontal surfaces 5ts, 5bs thus define between them a hollow volume 5h. The presence of this hollow volume 5h confers rigidity to the rear lower control arm 5.

The rear lower control arm 5 further comprises a first hole 17, designed to house a bottom end of the vibration damper 7. The first hole 17 is formed by the assembly of a top first hole 17t and a bottom first hole 17b respectively formed in the top and bottom parts 5t, 5b. Said top and bottom first holes 17t, 17b, comprise respectively top and bottom first hole side walls 17ts, 17bs, which are respectively delimited by top and bottom first hole side walls outer peripheries 17tso, 17bso. Said top and bottom first hole side walls outer peripheries 17tso, 17bso are joined together for example by welding, more particularly for example by MAG welding or laser welding. In a particular embodiment, said top and bottom first hole side wall outer peripheries 17tso, 17bso are not joined directly together but through the intermediary of a first intermediate part 17m, as depicted on FIG. 7. Optionally, said first intermediate part 17m, often referred to as the spring mount, is provided with a substantially horizontal lower part 17mh, on which the first end of the vibration damper 7 can rest. The top first hole side wall outer periphery 17tso is secured to the first intermediate part 17m along a top first hole assembly perimeter 17tw and the bottom first hole side wall outer periphery 17*bso* is secured to the first intermediate part 17*m* along a bottom first hole assembly perimeter 17*bw*, located lower in the elevation direction than the top first hole assembly perimeter 17*tw*.

Figure 7:
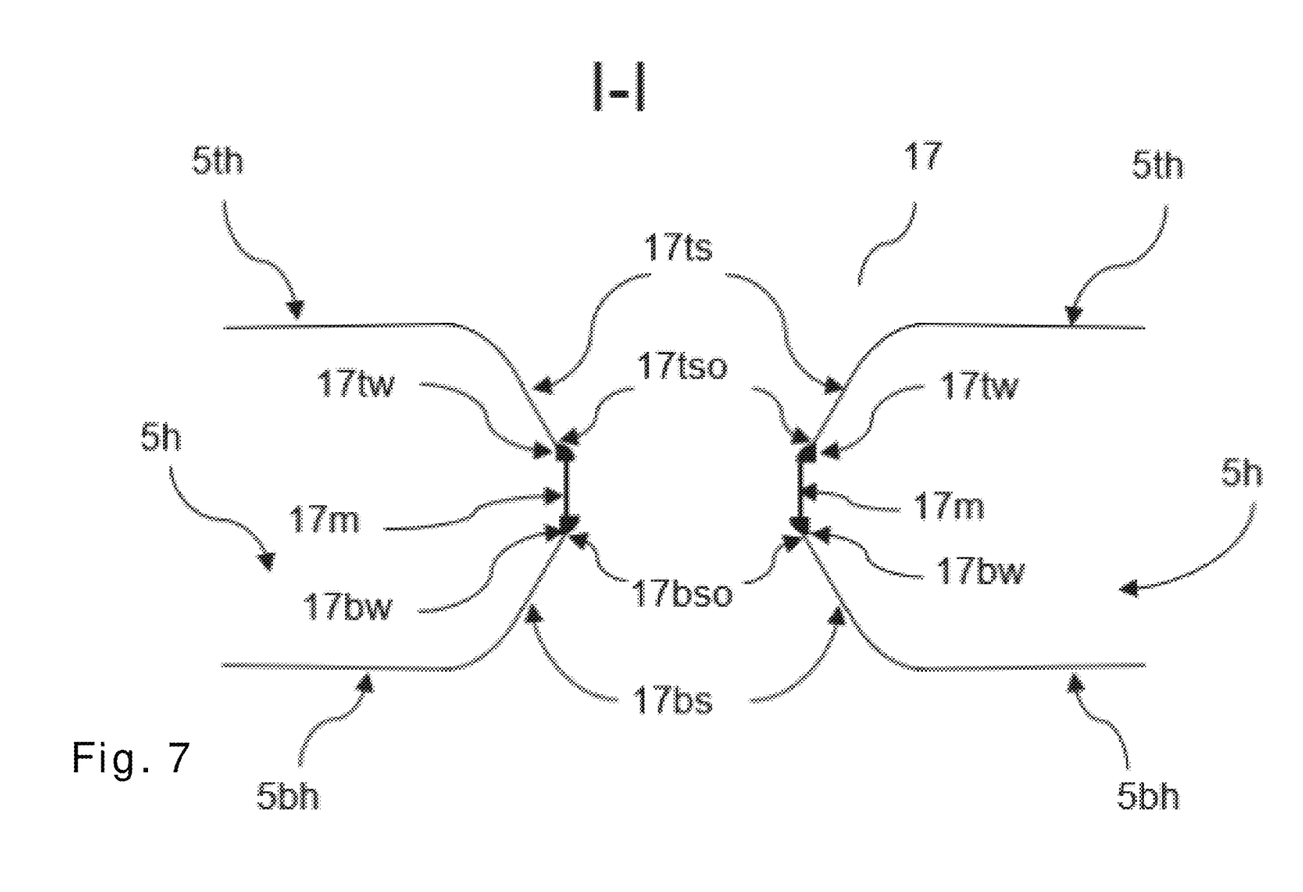
FIG. 7 is a cross-section view of a rear lower control arm according to the invention following the I-I cross section plane defined on FIG. 5.

The presence of said first intermediate part 17*m* allows for easier forming of the top and bottom parts 5*t*, 5*b* by stamping from a flat sheet. Indeed, in order to form the top and bottom first hole side walls 17*ts*, 17*bs*, it is necessary to perform a flanging operation whereby the side of a previously formed hole in the flat sheet is gradually deformed in a direction substantially perpendicular to the plane of the sheet. As the flanging operation is performed, the more the sides of the hole are deformed, the more it becomes susceptible to crack formation. Such a phenomenon is well known and the propensity of a material to resist to flanging deformations is known as the hole expansion ratio, which is defined by the normalized test ISO 16630. It is particularly critical in the case of high strength materials, for example in the case of high strength steels, for example in the case of steels having an ultimate tensile strength above 590 MPa. Thanks to the presence of the first intermediate part 17*m*, the sum of the heights of the top and bottom first side walls 17*ts*, 17*bs* can be lower than the total height h separating the top and bottom horizontal surfaces 5*th* and 5*bh*. By thus limiting the heights of the top and bottom first side walls 17*ts*, 17*bs*, the presence of the first intermediate part 17*m* allows to limit the risk of crack formation on the top and bottom first hole side walls outer peripheries 17*tso*, 17*bso* linked to the flanging operation.

Figure 8:
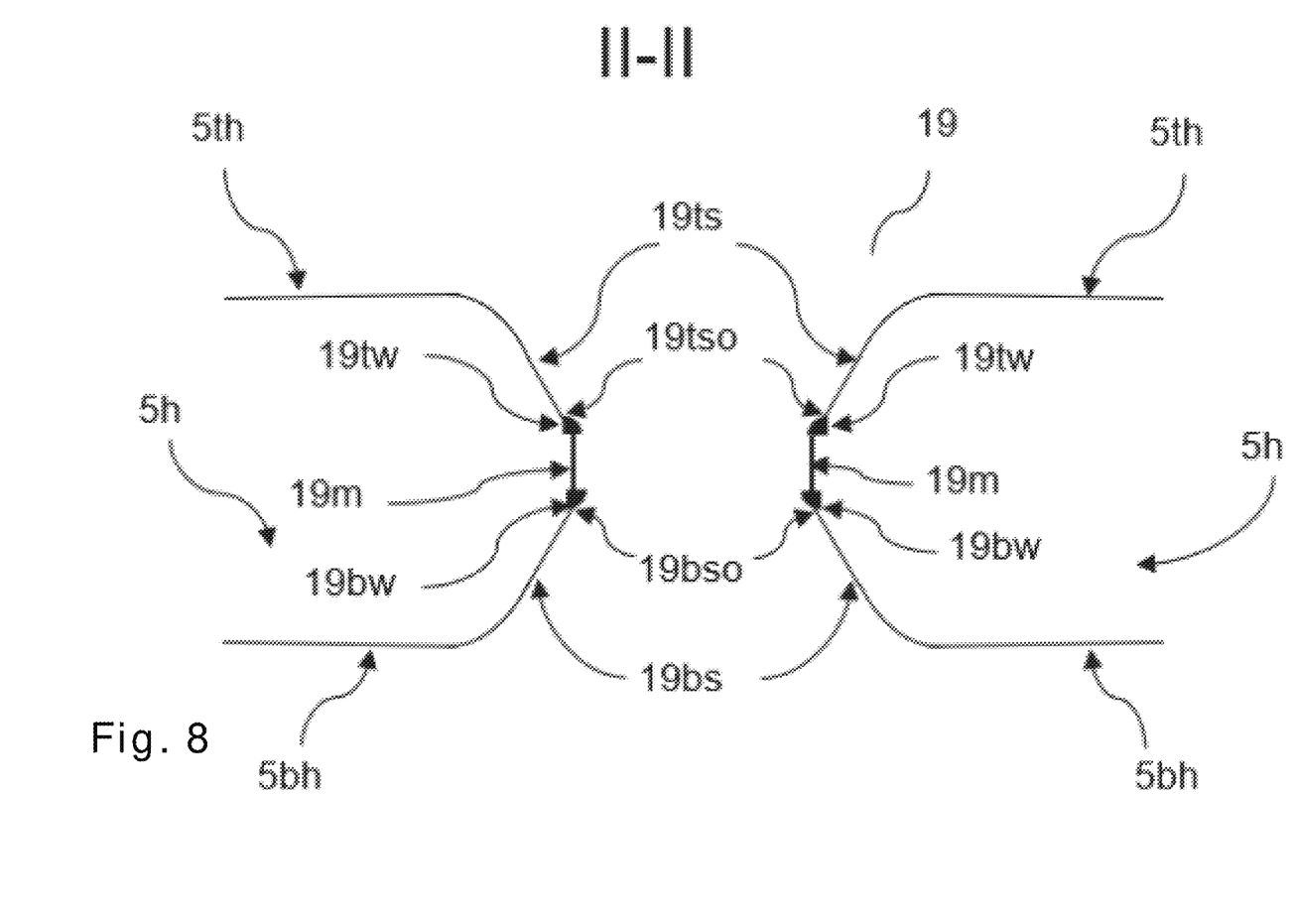
FIG. 8 is a cross-section view of a rear lower control arm according to the invention following the Il-Il cross section plane defined on FIG. 5.

The rear lower control arm 5 further comprises a second hole 19, designed to increase the vibration and stiffness performance of the part and also designed to lower the weight of the part. Said second hole 19 is formed by the assembly of a top second hole 19*t* and a bottom second hole 19*b*. Said top and bottom second holes 19*t*, 19*b*, comprise respectively top and bottom second hole side walls 19*ts*, 19*bs*, which are respectively delimited by top and bottom second hole side walls outer peripheries 19*tso*, 19*bso*. Said top and bottom second hole side walls outer peripheries 19*tso*, 19*bso* are joined together for example by welding, more particularly for example by MAG welding or laser welding. In a particular embodiment, said top and bottom second hole side walls outer peripheries 19*tso*, 19*bso* are not joined directly together but through the intermediary of a second intermediate part 19*m*, as depicted on FIG. 8. The top second hole side wall outer periphery 19*tso* is secured to the second intermediate part 19*m* along a top second hole assembly perimeter 19*tw* and the bottom second hole side wall outer periphery 19*bso* is secured to the second intermediate part 19*m* along a bottom second hole assembly perimeter 19*bw*, located lower in the elevation direction than the top second hole assembly perimeter 19*tw*. As is the case with the first hole 17, the use of a second intermediate part improves the formability of the second hole by stamping by reducing the height of the second wall top and bottom side walls 19*ts*, 19*bs* and therefore reducing the risk of crack formation around the top and bottom second wall side walls outer periphery 19*tso*, 19*bso* related to the flanging operation.

The inventors have found that surprisingly the introduction of the second hole 19 greatly increases the vibration and stiffness performance of the rear lower control arm 5 even though it also diminishes the total weight of the part. It is general common sense that the vibration and stiffness performance of a part increase with the weight of a part. For example, increasing the average thickness of a part while keeping the same overall design will necessarily result in better vibration and stiffness performance. However, in the current case it was possible to achieve an improvement in vibration and stiffness performance while lowering the weight of the part.

For example, for a lower control arm 5 made of top and bottom parts 5*t*, 5*b* made of stamped parts produced by stamping steel sheets of 1.8 mm average thickness and having an ultimate tensile strength higher than 780 MPa, the inventors have found that the first vibration mode of the part could be shifted from 295 Hz to 481 Hz just through the introduction of the above described second hole 19. In other words, the first mode was increased by 39%. These results were obtained using numerical calculations to simulate a free-free modal analysis. Such results could also be obtained by physically manufacturing the same part having the same overall design, one part having a first hole 17 only and the second part having a first hole 17 and a second hole 19 as previously described and by measuring the responses to vibrations using for example laser doppler vibrometers to evaluate the vibrations.

A modal analysis is performed to prevent issues in the field of NVH (Noise, vibration, and harshness). The idea is to have a sufficiently high first vibration mode, the precise numerical value to be reached being case dependent, so that the rear lower control arm 5 is stiff enough to have low transmissibility of the forces exerted on the wheel 9 to the rest of the body. By ensuing a sufficiently high first vibration mode, the rear lower control arm 5 will not be the weak link in the chain linking the wheel to the vehicle body and the passenger compartment.

This is achieved by the formation of the second hole 19, which ensures a further connection, outside the first hole 17, between the top horizontal surface 5*th* and the bottom horizontal surface 5*tb*. Thanks to the presence of this additional link it is possible to overcome the limitation of clamshell designs which naturally have a large flat panel in the top and bottom horizontal surfaces 5*th*, 5*tb*, said large flat panels being ideal candidates for vibration transmission.

The first and second holes 17, 19 can be for example of circular shape or oval shape. In order to minimize stress concentration, which would have a negative effect on the fatigue performance of the part, it is preferable to design said holes using smooth contours and to avoid any harsh angles in their shape.

Thanks to the adjunction of the second hole 19, the vibration performance of the lower control arm 5 can be significantly improved. Because the second hole 19 also involves removing part of the material making up the top and bottom horizontal surfaces 5*th*, 5*bh*, the presence of said second hole 19 also allows to reduce the weight of the part. The inventors found that the above-mentioned improvement of 39% of the vibration performance was associated with a weight reduction of the part of approximately 5%.

The following process can be applied in order to manufacture a rear lower control arm 5 according to the present invention:

a/providing a first a second flat sheet b/forming said first and second flat sheet, for example by stamping, in order to produce a top part 5*t* and a bottom part 5*b* comprising respectively a top and bottom horizontal surface 5*th*, 5*bh*, top and bottom side walls 5*ts*, 5*bs* a top and bottom horizontal surface outer periphery 5*tho*, 5*bho*, a top and bottom side wall outer periphery 5*tso*, 5*bso*, further comprising respectively a top and bottom first hole 17*t*, 17*b*, comprising respectively top and bottom first hole side walls 17*ts*, 17*bs*, and top and bottom first hole side walls outer peripheries 17*tso*, 17*bso*, and further comprising respectively a top and bottom second hole 19t, 19b, comprising respectively top and bottom second hole side walls 19ts, 19bs, and top and bottom second hole side walls outer peripheries 19tso, 19bso c/joining together said top and bottom parts 5t, 5b by securing them together along at least part of the top and bottom side wall outer periphery 5tso, 5bso to form an assembly perimeter 5w, and by securing them together along at least part of the top and bottom first hole side walls outer peripheries 17tso, 17bso, and by securing them together along at least part of the top and bottom second hole side walls outer peripheries 19tso, 19bso.

For example, the joining operation is performed by MAG welding or laser welding.

In a specific embodiment, the assembly process also comprises the following steps:
providing a first intermediate part 17m
joining the top and bottom first hole side walls outer peripheries 17tso, 17bso to said first intermediate part 17m to form a top and bottom first hole assembly perimeter 17tw, 17bw In a specific embodiment, the assembly process also comprises the following steps:
providing a second intermediate part 19m
joining the top and bottom second hole side walls outer peripheries 19tso, 19bso to said second intermediate part 19m to form a top and bottom second hole assembly perimeter 19tw, 19bw In a specific embodiment, the assembly process can further comprise the following steps between step b and step c
providing bushings 15 comprising a vibration damping material
positioning the bushings in between previously arranged top side wall apertures 5tsa and bottom side wall apertures 5bsa Advantageously, by positioning said bushings 15 in between said top and bottom side wall apertures 5tsa, 5bsa, the bushings will be naturally held into place in between the top and bottom horizontal surfaces 5th, 5bh.

In a particular embodiment, said top and bottom side wall apertures 5tsa, 5bsa are located in the corners of the top and bottom horizontal surfaces 5th, 5bh.

What is claimed is:

1. A rear lower control arm for a motor vehicle comprising:
a top part and a bottom part defining together a hollow volume, the top and bottom parts including respectively:
a top and bottom horizontal surface, delimited respectively by a top and bottom horizontal surface outer periphery;
top and bottom side walls extending in a direction of at least 45° compared to the horizontal plane along at least part of the top and bottom horizontal surface outer periphery, the top and bottom side walls being delimited respectively by a top and bottom side wall outer periphery;
a top and bottom first hole including respectively top and bottom first hole side walls extending in a direction of at least 45° compared to the horizontal plane, the top and bottom first hole side walls being delimited by top and bottom first hole side walls outer peripheries; and
a top and bottom second hole including respectively top and bottom second hole side walls, extending in a direction of at least 45° compared to the horizontal plane, the top and bottom second hole side walls being delimited by top and bottom second hole side walls outer peripheries;
wherein the top and bottom parts are joined together:
by securing together at least part of the top and bottom horizontal surface outer peripheries;
by securing together at least part of the top and bottom first hole side walls outer peripheries; and
by securing together at least part of the top and bottom second hole side walls outer peripheries.

2. The rear lower control arm as recited in claim 1 wherein the top and bottom parts are joined together by welding.

3. The rear lower control arm as recited in claim 1 wherein the top and bottom first hole side walls outer peripheries are joined together by an intermediary of a first intermediate part, wherein the top first hole side wall outer periphery is attached to the first intermediate part along a top first hole assembly perimeter, the bottom first hole side walls outer periphery is attached to the first intermediate part along a bottom first hole assembly perimeter and wherein said top first hole assembly perimeter is located higher than said bottom first hole assembly perimeter in an elevation direction.

4. The rear lower control arm as recited in claim 1 wherein the top and bottom second hole side wall outer peripheries are joined together by an intermediary of a second intermediate part, wherein the top second hole side wall outer periphery is attached to the second intermediate part along a top second hole assembly perimeter, the bottom second hole side wall outer periphery is attached to the second intermediate part along a bottom second hole assembly perimeter and wherein the top second hole assembly perimeter is located higher in an elevation direction than the bottom second hole assembly perimeter.

5. The rear lower control arm as recited in claim 1 further comprising four attachment points for chassis elements of the vehicle, the four attachment points being equipped with bushings including a vibration damping material.

6. The rear lower control arm as recited in claim 5 wherein the top and bottom side walls do not extend around the entire length of respectively the top and bottom horizontal surface outer periphery, areas where the top and bottom side walls do not extend being defined respectively as top and bottom side wall apertures and wherein the bushings are located in between at least part of the top and bottom side wall apertures.

7. The rear lower control arm as recited in claim 1 wherein the top and bottom parts are made of steel having an ultimate tensile strength above 780 MPa, as measured according to ISO standard ISO 6892-1, published in October 2009.

8. A method for manufacturing the rear lower control arm as recited in claim 1, the method comprising the steps of:
a/providing a first and a second flat sheet;
b/forming the first and second flat sheet, in order to produce a top part and a bottom part including respectively a top and bottom horizontal surface, top and bottom side walls, a top and bottom horizontal surface outer periphery, a top and bottom side wall outer periphery, further including respectively a top and bottom first hole, the top and bottom first holes including respectively top and bottom first hole side walls, and top and bottom first hole side walls outer peripheries, and further including respectively a top and bottom second hole, the top and bottom second holes including respectively top and bottom second hole side walls, and top and bottom second hole side wall outer peripheries;

c/joining together the top and bottom parts by securing them together along at least part of the top and bottom side wall outer periphery, by securing them together along at least part of the top and bottom first hole side walls outer peripheries, and by securing them together along at least part of the top and bottom second hole side walls outer peripheries.

9. The method as recited in claim 8 further comprising the steps of:
providing a first intermediate part; and
joining the top and bottom first hole side walls outer peripheries to the first intermediate part to form a top and bottom first hole assembly perimeter.

10. The process as recited in claim 8 further comprising the steps of:
providing a second intermediate part; and
joining the top and bottom second hole side walls outer peripheries to the second intermediate part to form a top and bottom second hole assembly perimeter.

11. The method as recited in claim 8 further comprising the steps of:
providing bushings including a vibration damping material; and
positioning the bushings in between previously arranged top side wall apertures and bottom side wall apertures.

* * * * *